(12) United States Patent
Tsuji

(10) Patent No.: US 8,181,972 B2
(45) Date of Patent: May 22, 2012

(54) SEALING MATERIAL FOR DOVETAIL GROOVE AND VACUUM GATE VALVE PROVIDED WITH SEALING MATERIAL FOR DOVETAIL GROOVE

(75) Inventor: Kazuaki Tsuji, Machida (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 965 days.

(21) Appl. No.: 12/162,881

(22) PCT Filed: Jan. 29, 2007

(86) PCT No.: PCT/JP2007/051370
§ 371 (c)(1),
(2), (4) Date: Jul. 31, 2008

(87) PCT Pub. No.: WO2007/088806
PCT Pub. Date: Aug. 9, 2007

(65) Prior Publication Data
US 2009/0026717 A1    Jan. 29, 2009

(30) Foreign Application Priority Data
Jan. 31, 2006    (JP) .................................. 2006-022235

(51) Int. Cl.
*F16K 1/22*    (2006.01)
(52) U.S. Cl. ........................................ 277/644; 277/641

(58) Field of Classification Search .................. 277/630, 277/637, 639, 641, 642, 644
See application file for complete search history.

(56) References Cited

U.S. PATENT DOCUMENTS

| | | | |
|---|---|---|---|
| 3,558,097 A * | 1/1971 | DeFrees | 251/88 |
| 5,513,674 A * | 5/1996 | Frisch | 137/625.69 |
| 6,523,833 B1 * | 2/2003 | Ishigaki et al. | 277/650 |

FOREIGN PATENT DOCUMENTS

| | | |
|---|---|---|
| JP | 0517270 U | 3/1993 |
| JP | 2003014126 A | 1/2003 |

* cited by examiner

*Primary Examiner* — Gilbert Lee
(74) *Attorney, Agent, or Firm* — The Webb Law Firm

(57) ABSTRACT

A sealing material in a closed circular shape for a dovetail groove formed on the surface of one member and to be abutted to the surface of the other member to seal a space between the both members, the sealing material for a dovetail groove in a cross-sectional shape includes: a bottom portion that comes into contact with the bottom face of the dovetail groove and that has corner portions formed slightly narrower than the narrowest width of the opening portion of the dovetail groove; a side protruding portion that is formed continuously from the bottom portion; an overhanging shoulder portion that is formed continuously from the side protruding portion; and a sealing protrusion that is formed continuously from the overhanging shoulder portion and that is protruded upward from the opening portion of the dovetail groove to seal a space between the both members in the case in which the sealing protrusion is abutted to the surface of the other member.

14 Claims, 11 Drawing Sheets

Fig. 5
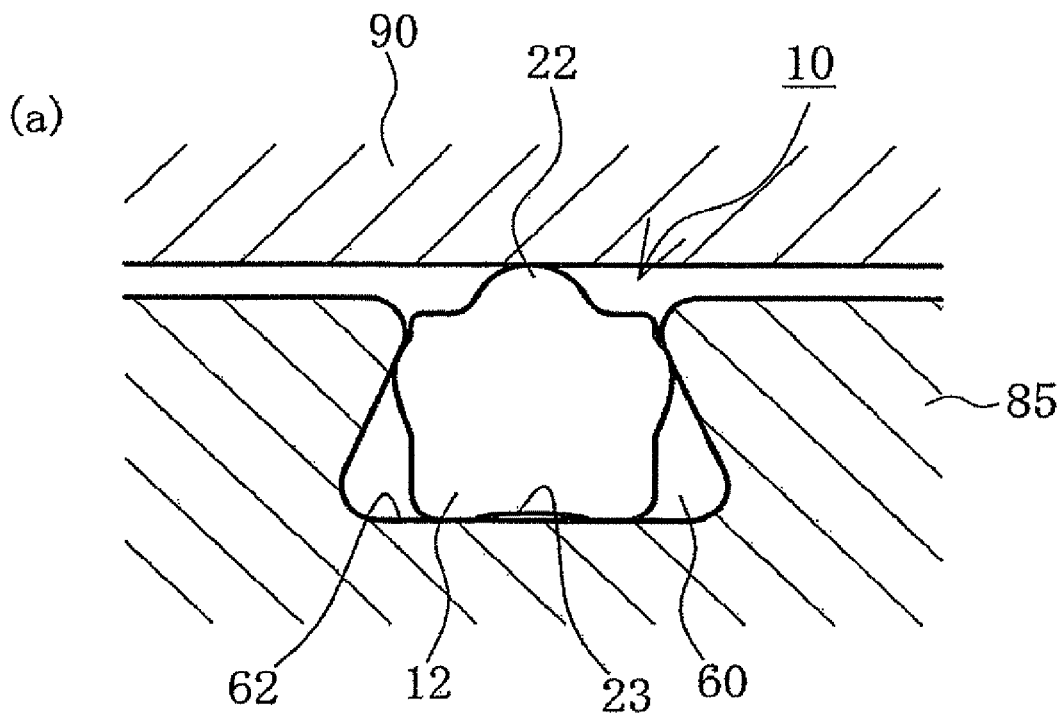
(a)
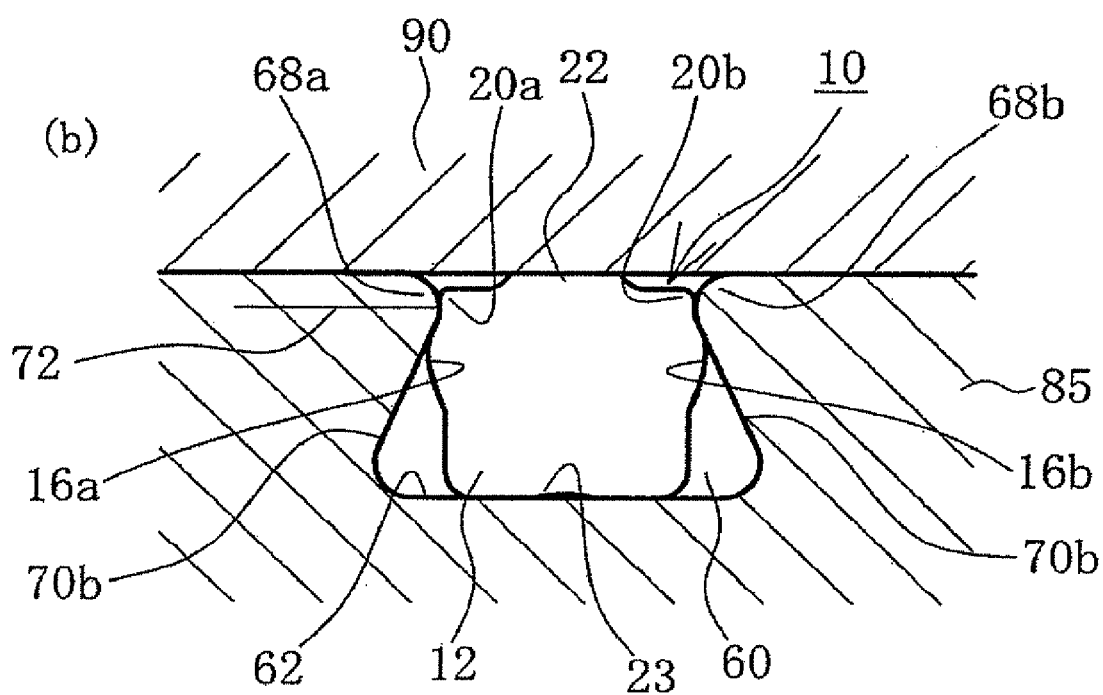
(b)

SEALING MATERIAL FOR DOVETAIL GROOVE AND VACUUM GATE VALVE PROVIDED WITH SEALING MATERIAL FOR DOVETAIL GROOVE

TECHNICAL FIELD

The present invention relates to a sealing material for a dovetail groove and a vacuum gate valve provided with the sealing material for a dovetail groove.

BACKGROUND ART

A vacuum gate valve of a one-action type is known for instance as a vacuum gate valve that is used for a semiconductor manufacturing apparatus or the like.

FIG. 9 is an exploded perspective view showing a vacuum gate valve of a one-action type.

More specifically, for a structure of a vacuum gate valve 100, a valve plate 102 carries out a linear movement in a single direction by a force applied from an actuator 104, thereby sealing a gate opening portion 106 in an almost rectangular shape.

For the vacuum gate valve 100, an O ring 108 having a circular cross section is used in general as a sealing material mounted on a peripheral face of the valve plate 102.

In some cases, the vacuum gate valve 100 is used for a load lock chamber in which a pressure reduction and an atmospheric release are repeated in order to transfer a substrate inside or outside in a semiconductor manufacturing apparatus or an FPD manufacturing apparatus, etc.

In the case in which a load lock chamber is released to the atmosphere in the state in which a valve body of the vacuum gate valve 100 is closed, a differential pressure of one atmosphere is applied to the valve body and the valve body is moved in the direction opposite to the load lock chamber while the valve body is closed. When a pressure reduction of the load lock chamber is carried out again, the valve body is moved again to the load lock chamber side. As described above, for the vacuum gate valve 100 mounted to the load lock chamber, the valve body is moved in a horizontal direction at frequent intervals due to the configuration of the apparatus.

For instance, as shown in FIG. 10, in the case in which the valve plate 102 is moved repeatedly in the arrow direction, a resultant force of a sealing load and a thrust load is repeatedly applied to the O ring 108. Consequently, torsion occurs in a part of the O ring 108 and a sealing failure occurs easily.

A shape of the O ring 108 having a circular cross section causes a rolling motion easily, thereby causing the O ring 108 to drop out from a sealing groove 112. As described above, for the vacuum gate valve 100 provided with the O ring 108 that easily causes a sealing failure due to torsion or dropping out, a maintenance operation for exchanging the O ring 108 is required at frequent intervals. The maintenance operation stops a production line temporarily, thereby causing a great loss in productivity and an increased cost.

On the other hand, in the case in which the O ring 108 is used and the vacuum gate valve 100 is enlarged according to a growing in size of a processed material such as a silicon wafer, it is necessary to allow a processing accuracy and a fabrication error. Consequently, a cross sectional shape of the O ring 108 must be also enlarged.

In the case in which the vacuum gate valve 100 is enlarged, a load for obtaining a compression amount to the O ring 108 is enlarged. As a result, it is necessary to increase a rigidity of a valve casing 110 and to heighten an output of the actuator 104 in order to increase a pressing force, thereby greatly causing a cost to be increased.

In recent years, some applicants provide a sealing material of a special deformed product in place of the O ring having a circular cross section and a sealing material for a dovetail groove in which the sealing material of the special deformed product is mounted and disposed in the dovetail groove.

FIG. 11 shows a sealing material 200 for a dovetail groove filed by the present applicant. For the sealing material 200 for a dovetail groove, an O ring having not a circular cross section but a deformed shape is adopted to prevent the O ring from dropping out and rolling (see Patent document 1: Japanese Patent Application Laid-Open Publication No. 2003-14126).

The cross sectional shape of the sealing material 200 for a dovetail groove includes shapes composed of a flat bottom side 202 disposed on a bottom face 222 of a dovetail groove 220, right and left oblique sides 204 rising at an angle outward from the both ends of the bottom side 202, right and left overhanging portions 206 that are disposed at the ends of the right and left oblique sides 204 and that are close to an opening portion 224 of the dovetail groove 220, a central protrusion 208 that is formed between the right and left overhanging portions 206 and that is protruded upward from the opening portion 224 of the dovetail groove 220, and concaves 210 that are formed between the central protrusion 208 and the overhanging portions 206 and that are depressed inside the tangential line of the central protrusion 208 and the overhanging portion 206.

The sealing material 200 for a dovetail groove has a symmetric cross section and thereby has a rolling prevention effect against a thrust load from the both directions.

In the case in which the sealing material 200 for a dovetail groove is being mounted in the dovetail groove 220, the sealing material 200 may not be upside down in the dovetail groove 220 since the sealing material 200 has a shape in which the bottom side 202 can be easily found.

Patent document 1: Japanese Patent Application Laid-Open Publication No. 2003-14126

DISCLOSURE OF THE INVENTION

Problems to be Solved by the Invention

However, in the case in which a strong force is applied in an oblique direction to the central protrusion 208 for such conventional sealing material 200 for a dovetail groove, it cannot be completely suppressed that one overhanging portion 206 drops out from the opening portion 224 of the dovetail groove 220.

Moreover, in the case in which the sealing material 200 for a dovetail groove is compressed excessively, a particle may be generated due to rubbing between metals.

Furthermore, in the case of the sealing material for a dovetail groove having a deformed cross section, it is hard to mount the sealing material in a dovetail groove in many cases.

The present invention was made in consideration of such conditions, and an object of the present invention is to provide a sealing material for a dovetail groove suitably used for a semiconductor manufacturing apparatus and a liquid crystal manufacturing apparatus or the like in particular, the sealing material for a dovetail groove being satisfactorily mounted and disposed in a dovetail groove in which rolling or dropping out from the dovetail groove does not occur even in the case in which a sealing load or a thrust load is applied to the sealing material for a dovetail groove in the right and left directions.

Another object of the present invention is to provide a vacuum gate valve that can obtain a sufficient sealing force at a low load even in the case in which the vacuum gate valve is enlarged for being used for a semiconductor manufacturing apparatus and a liquid crystal manufacturing apparatus or the like.

SUMMARY OF THE INVENTION

The present invention was made in order to solve the above problems of the conventional art and to achieve the purpose.

For a sealing material in a closed circular shape for a dovetail groove to be mounted to a dovetail groove formed on the surface of one member and to be abutted to the surface of the other member to seal a space between the both members in a jointing position of a pair of members facing to each other, the sealing material for a dovetail groove in a cross-sectional shape in accordance with the present invention is characterized by comprising:

a bottom portion that comes into contact with the bottom face of the dovetail groove and that has corner portions formed slightly narrower than the narrowest width of the opening portion of the dovetail groove;

a side protruding portion that is formed continuously from the bottom portion and that is protruded in a width direction from the corner portion of the bottom portion in such a manner that the side protruding portion is abutted to an oblique side formed inside the dovetail groove;

an overhanging shoulder portion that is formed continuously from the side protruding portion in which a corner portion of the overhanging shoulder portion is positioned closer to the bottom face of the dovetail groove as compared with the position of the side end face of the opening portion of the dovetail groove and is positioned closer to the opening portion side of the dovetail groove as compared with the position of the narrowest section of the dovetail groove; and a sealing protrusion that is formed continuously from the overhanging shoulder portion and that is protruded upward from the opening portion of the dovetail groove to seal a space between the both members in the case in which the sealing protrusion is abutted to the surface of the other member, in a cross sectional shape of the sealing material for a dovetail groove to be mounted to the dovetail groove.

By the above configuration, the sealing material for a dovetail groove can be prevented from rolling and dropping out from the dovetail groove.

Moreover, since the overhanging shoulder portion is formed on the sealing material for a dovetail groove, the behavior of the sealing material for a dovetail groove in the dovetail groove can be stable, thereby obtaining a high rolling prevention effect.

Furthermore, the boundary between the overhanging shoulder portion and the side protruding portion is in a concave shape. Consequently, in the case in which the sealing material for a dovetail groove is mounted, the section in a concave shape is abutted to the narrowest section of the dovetail groove, and the sealing material for a dovetail groove is inserted in the bottom face direction of the dovetail groove in such a manner that the sealing material is revolved around the concave as the base point. Therefore, anyone can easily mount the sealing material for a dovetail groove to the dovetail groove.

Furthermore, since the side protruding portion in an almost circular arc shape is abutted in a wide range to the oblique side formed inside the dovetail groove, a concentration of stress can be reduced and a generation of a particle caused by an abnormal abrasion of the sealing material for a dovetail groove can be prevented.

The sealing material for a dovetail groove in accordance with the present invention is characterized in that the range of W1 is indicated by $0.75G<W1<G$ in the case in which a width of the widest section of the overhanging shoulder portion for the sealing material for a dovetail groove is W1 and a width of the narrowest section of the opening portion of the dovetail groove is G.

In the case in which a width of the widest section of the overhanging shoulder portion is set in such a range, the overhanging shoulder portion is abutted to the corner portion of the opening portion end of the dovetail groove even when a strong force is applied in an oblique direction to the sealing protrusion, thereby preventing the sealing material for a dovetail groove from rolling or being off-balance in the dovetail groove.

The sealing material for a dovetail groove in accordance with the present invention is characterized in that the range of H1 is indicated by $1.20H<H1<1.60H$ in the case in which a distance from the bottom face of the dovetail groove to the side end face of the opening portion of the dovetail groove is H and a distance from the bottom face of the dovetail groove to the top position of the sealing protrusion is H1.

In the case in which the top position of the sealing protrusion is set in such a range, a sufficient sealing performance between one member and the other member can be obtained when the sealing protrusion is abutted to the surface of the other member.

The sealing material for a dovetail groove in accordance with the present invention is characterized in that the range of H2 is indicated by $0.90H<H2<0.95H$ in the case in which a distance from the bottom face of the dovetail groove to the side end face of the opening portion of the dovetail groove is H and a distance from the bottom face of the dovetail groove to the base end portion of the side protruding portion on the side end face side of the opening portion of the dovetail groove is H2.

In the case in which the position of the base end portion of the side protruding portion on the side end face side of the opening portion of the dovetail groove is set in such a range, the side protruding portion is abutted to the oblique side around the narrowest section of the inside oblique side opening portion of the dovetail groove. Consequently, it is not necessary to protrude the side protruding portion in a width direction more than needs.

Therefore, the sealing material for a dovetail groove can be easily mounted to the dovetail groove, and the behavior of the sealing material for a dovetail groove in the dovetail groove can be stable after mounting, thereby obtaining a high rolling prevention effect.

The sealing material for a dovetail groove in accordance with the present invention is characterized in that the range of W2 is indicated by $0.75G<W2<G$ in the case in which a width of the narrowest section of the opening portion of the dovetail groove is G and a width of the widest section of the bottom portion is W2.

In the case in which a width of the widest section of the bottom portion is set in such a range, the sealing material for a dovetail groove can be easily mounted to the dovetail groove, and the bottom face of the sealing material for a dovetail groove is disposed on the bottom face of the dovetail groove, thereby displaying a stable sealing performance.

The sealing material for a dovetail groove in accordance with the present invention is characterized in that a concave is formed on the bottom portion.

By the above configuration, since the concave is sufficiently deformed during a sealing operation between one member and the other member, a sealing force can be obtained at a low load.

The sealing material for a dovetail groove in accordance with the present invention is characterized in that the sealing material for a dovetail groove bottom portion is in a symmetric shape with respect to a perpendicular line drawn from the top position of the sealing protrusion to the bottom portion.

By the above configuration, the sufficient resistance characteristics can be obtained against the rolling in right and left directions.

A vacuum gate valve in accordance with the present invention is characterized in that the sealing material for a dovetail groove is mounted to a valve body.

By the above configuration, the sealing material for a dovetail groove can be prevented from rolling, and the sealing material for a dovetail groove can be satisfactorily mounted and disposed in a dovetail groove. In addition, a metal touch and a particle can be prevented from occurring, and a maintenance operation caused by a sealing failure can be reduced.

As a result, the vacuum gate valve in accordance with the present invention can be effectively applied to a load lock chamber or the like. In addition, a productivity of a wafer or the like can be improved.

EFFECT OF THE INVENTION

By the sealing material for a dovetail groove and a vacuum gate valve provided with the sealing material for a dovetail groove in accordance with the present invention, the sealing material for a dovetail groove can be suitably used for a semiconductor manufacturing apparatus and a liquid crystal manufacturing apparatus or the like in particular, and the sealing material for a dovetail groove can be satisfactorily mounted and disposed in a dovetail groove while rolling or dropping out from the dovetail groove does not occur even in the case in which a sealing load or a thrust load is applied to the sealing material for a dovetail groove in the right and left directions.

Moreover, the vacuum gate valve in which the sealing material for a dovetail groove is adopted can be effectively applied to a load lock chamber in which a pressure reduction and an atmospheric release are repeated.

BRIEF DESCRIPTION OF THE DRAWINGS

FIG. 1(a) is a plan view, FIG. 1(b) is a side view, FIG. 1(c) is a bottom view, and FIG. 1(d) is a cross-sectional view taken along the line X-X of FIG. 1(a).

FIG. 5 is a schematic cross-sectional view showing a state of deformation during tightening of the sealing material in accordance with an embodiment of the present invention.

BEST MODE OF CARRYING OUT THE INVENTION

An embodiment (example) of the present invention will be described below in detail with reference to the drawings.

Figure 1:
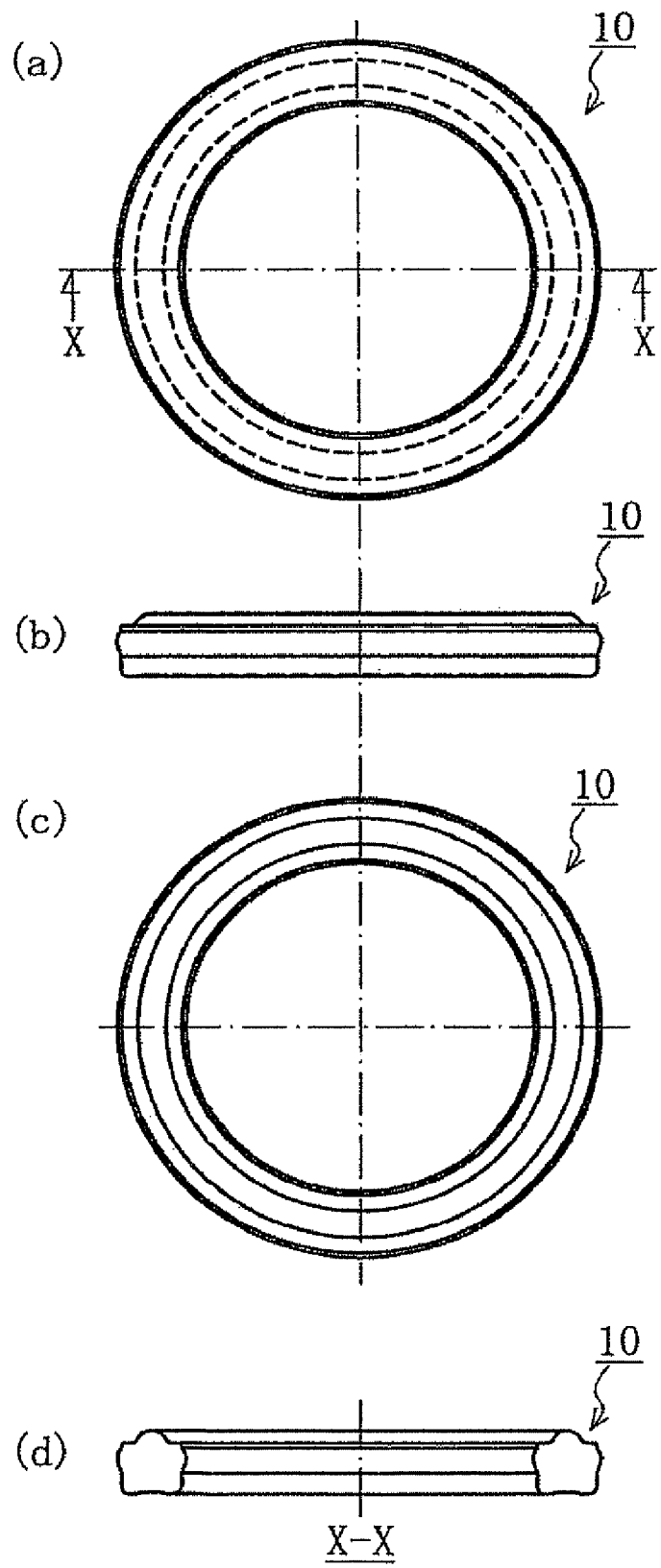
FIG. 1 shows a sealing material 10 for a dovetail groove in accordance with an embodiment of the present invention.

FIG. 1 shows a sealing material 10 for a dovetail groove in accordance with an embodiment of the present invention. FIG. 1(a) is a plan view, FIG. 1(b) is a side view, FIG. 1(c) is a bottom view, and FIG. 1(d) is a cross-sectional view taken along the line X-X of FIG. 1(a).

Figure 2:
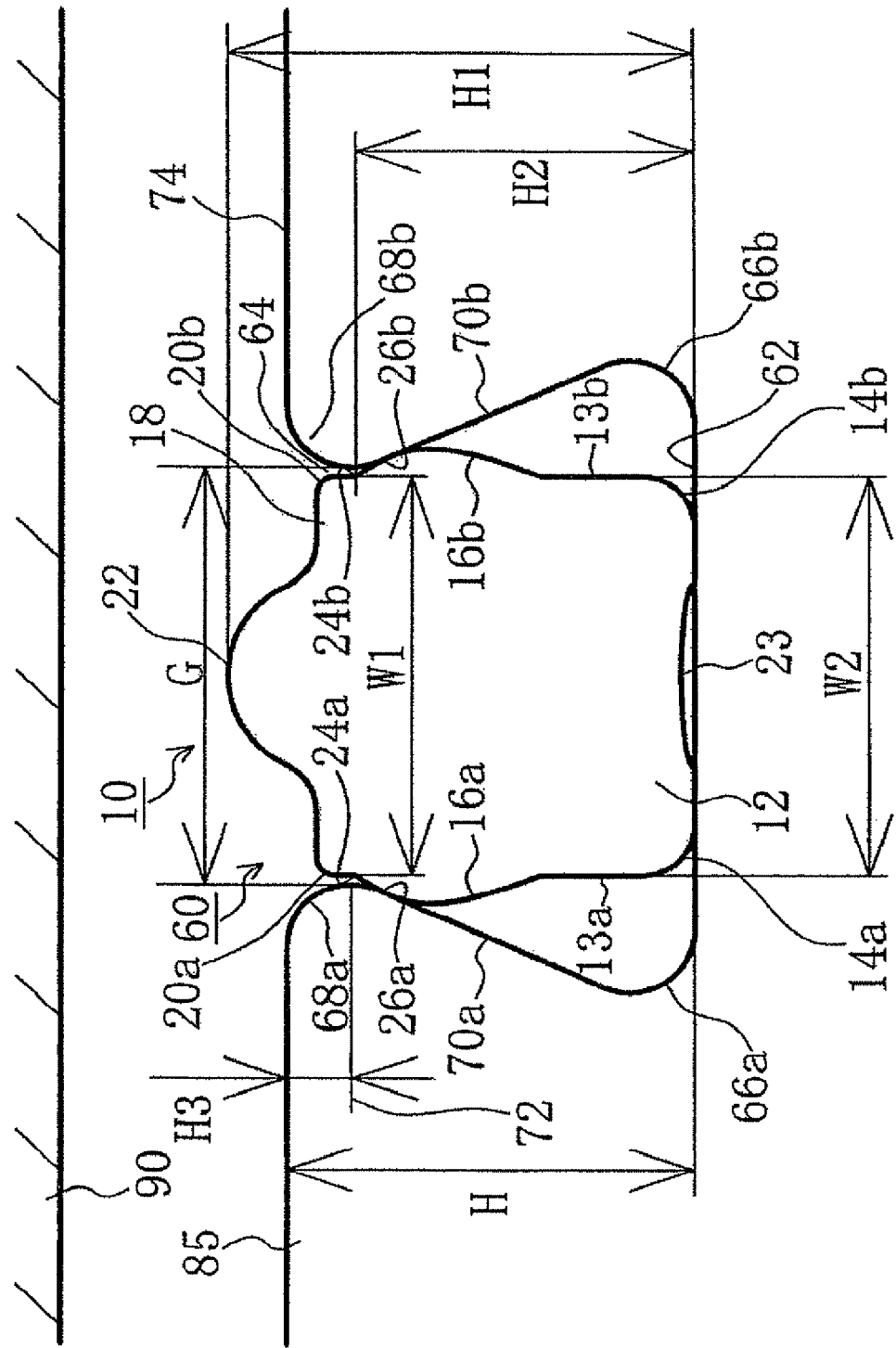
FIG. 2 is a cross-sectional view showing a mounted state of the sealing material 10 for a dovetail groove in accordance with an embodiment of the present invention.
Figure 3:
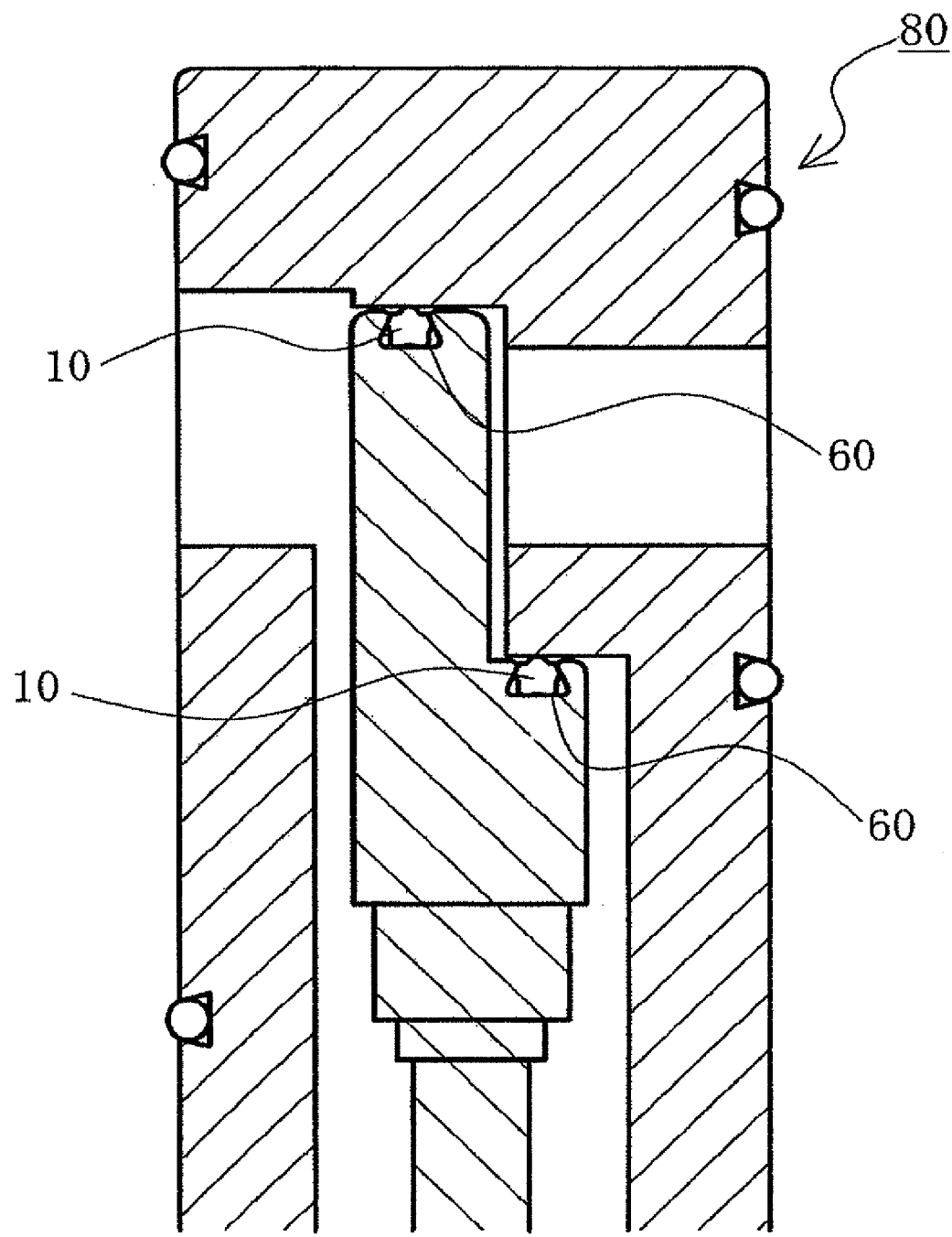
FIG. 3 is a schematic view showing an outline of a vacuum gate valve 80 provided with the sealing material 10 for a dovetail groove in accordance with an embodiment of the present invention.

FIG. 2 is a cross-sectional view showing a mounted state of the sealing material 10 for a dovetail groove in accordance with an embodiment of the present invention. FIG. 3 is a schematic view showing an outline of a vacuum gate valve 80 provided with the sealing material 10 for a dovetail groove in accordance with an embodiment of the present invention.

As shown in FIGS. 1(a) to 1(c), a sealing material 10 for a dovetail groove in accordance with the present invention is a closed circular sealing material, and the cross-sectional shape is composed of a plurality of protrusions and depressions as shown in FIG. 1(d).

As shown in FIG. 2, the sealing material 10 for a dovetail groove is mounted to the sealing section of one member 85 (corresponding to a valve plate for instance) provided with a closed circular dovetail groove 60 and the other member 90 (corresponding to a valve casing for instance).

The dovetail groove 60 formed on the surface of one member 85 has an opening portion 64 in which a section close to the surface of one member 85 is narrowest. The dovetail groove 60 is in a trapezoidal shape expanding in a tapered shape from the edge of the opening portion 64 to a bottom face 62 of the dovetail groove 60 and has a pair of oblique sides 70a and 70b and the flat bottom face 62.

The corner portions 68a and 68b at the end of the opening portion 64 of the dovetail groove 60 and corner portions 66a and 66b on the bottom face 62 side have a large radius.

The sealing material 10 for a dovetail groove is provided with a bottom portion 12 that comes into contact with the bottom face 62 of the dovetail groove 60 and has corner portions 14a and 14b formed slightly narrower than the narrowest width of the opening portion 64 of the dovetail groove 60. R concave 23 can also be formed on the bottom portion 12. In the case in which the concave 23 is formed, an equivalent sealing performance can be obtained when one member and the other member are sealed even if a pressing force is slightly small as compared with the case in which a concave 23 is not formed.

Moreover, side protruding portions 16a and 16b are formed continuously from the bottom portion 12 and are protruded in a width direction from the corner portions 14a and 14b in such a manner that the side protruding portions are abutted to the oblique sides 70a and 70b formed inside the dovetail groove 60.

Furthermore, an overhanging shoulder portion 18 is formed above the side protruding portions 16a and 16b and continuously from the side protruding portions 16a and 16b.

For the overhanging shoulder portion 18, right and left corner portions 20a and 20b are positioned closer to the bottom face 62 side of the dovetail groove 60 as compared with the position of the side end face of the opening portion 64 of the dovetail groove 60 and positioned closer to the opening portion 64 side of the dovetail groove 60 as compared with the position 72 of the narrowest section of the dovetail groove 60. That is, the overhanging shoulder portion 18 is formed in such a manner that the right and left corner portions 20a and 20b are positioned in the range of H3.

Moreover, a sealing protrusion 22 is formed continuously from the overhanging shoulder portion 18 and is protruded upward from the opening portion 64 of the dovetail groove 60 to seal a space between the both members in the case in which the sealing protrusion 22 is abutted to the surface of the other member 90.

The sealing material 10 for a dovetail groove is configured as described above.

The desirable design conditions of each section of the sealing material 10 for a dovetail groove in accordance with the present embodiment will be described in the following.

As shown in FIG. 2, in the case in which a width of the widest section of the overhanging shoulder portion 18 for the sealing material 10 for a dovetail groove is W1 and a width of the narrowest section of the opening portion 64 of the dovetail groove 60 is G, it is preferable that the range of W1 is indicated by 0.75G<W1<G.

In the case in which a width of the widest section of the overhanging shoulder portion 18 is set in such a range, the overhanging shoulder portion 18 is abutted to the corner portions 68a and 68b of the opening portion 64 end of the dovetail groove 60 when a strong force is applied in an oblique direction to the sealing protrusion 22, thereby preventing the sealing material 10 for a dovetail groove from rolling or being off-balance in the dovetail groove 60.

In the case in which a distance from the bottom face 62 of the dovetail groove 60 to the side end face 74 of the opening portion of the dovetail groove 60 is H and a distance from the bottom face 62 of the dovetail groove 60 to the top position of the sealing protrusion 22 is H1, it is preferable that the range of H1 is indicated by 1.20H<H1<1.60H.

In the case in which the top position of the sealing protrusion 22 is set in such a range, a sufficient sealing performance between one member 85 and the other member 90 can be obtained when the sealing protrusion 22 is abutted to the surface of the other member 90.

In the case in which a distance from the bottom face 62 of the dovetail groove 60 to the side end face 74 of the opening portion of the dovetail groove 60 is H and a distance from the bottom face 62 of the dovetail groove 60 to the base end portion of the side protruding portions 16a and 16b on the side end face 74 side of the opening portion of the dovetail groove 60 is H2, it is preferable that the range of H2 is indicated by 0.90H<H2<0.95H.

In the case in which the position of the base end portion of the side protruding portions 16a and 16b on the side end face 74 side of the opening portion of the dovetail groove 60 is set in such a range, the side protruding portions 16a and 16b are abutted to the oblique sides 70a and 70b around the narrowest section of the inside oblique side opening portion of the dovetail groove 60. Consequently, it is not necessary to protrude the side protruding portions 16a and 16b in a width direction more than needs.

Therefore, the sealing material 10 for a dovetail groove can be easily mounted to the dovetail groove 60, and the behavior of the sealing material 10 for a dovetail groove in the dovetail groove 60 can be stable after mounting, thereby obtaining a high rolling prevention effect.

In the case in which a width of the narrowest section of the opening portion 64 of the dovetail groove 60 is G and a width of the widest section of the bottom portion 12 is W2, it is preferable that the range of W2 is indicated by 0.75G<W2<G.

In the case in which a width of the widest section of the bottom portion 12 is set in such a range, the sealing material 10 for a dovetail groove can be easily mounted to the dovetail groove 60, and the bottom face of the sealing material 10 for a dovetail groove is disposed on the bottom face of the dovetail groove 60, thereby displaying a stable sealing performance.

It is desirable that the dimensions of each section are designed in the above range.

The sealing material 10 for a dovetail groove is made of a rubber material that can be elastically deformed in whole.

As a rubber material, there can be mentioned for instance a fluorocarbon rubber, a silicon rubber, and an EPDM rubber having a degree of hardness in the range of 60 to 70 HA. In the case in which the rubber material is used for a vacuum gate valve or the like of a semiconductor manufacturing apparatus or a liquid crystal manufacturing apparatus, a fluorocarbon rubber having an excellent plasma resistance is preferable since the inside of the apparatus is under the plasma environment in many cases.

As shown in FIG. 3, in the case in which the sealing material 10 for a dovetail groove is used in a load lock chamber in which a pressure reduction and an atmospheric release are repeated for a vacuum gate valve 80 for instance, the sealing material for a dovetail groove can be satisfactorily mounted and disposed in the dovetail groove 60 in which rolling or dropping out from the dovetail groove does not occur even in the case in which a sealing load or a thrust load is applied to the sealing material 10 for a dovetail groove in the right and left directions.

Figure 4:
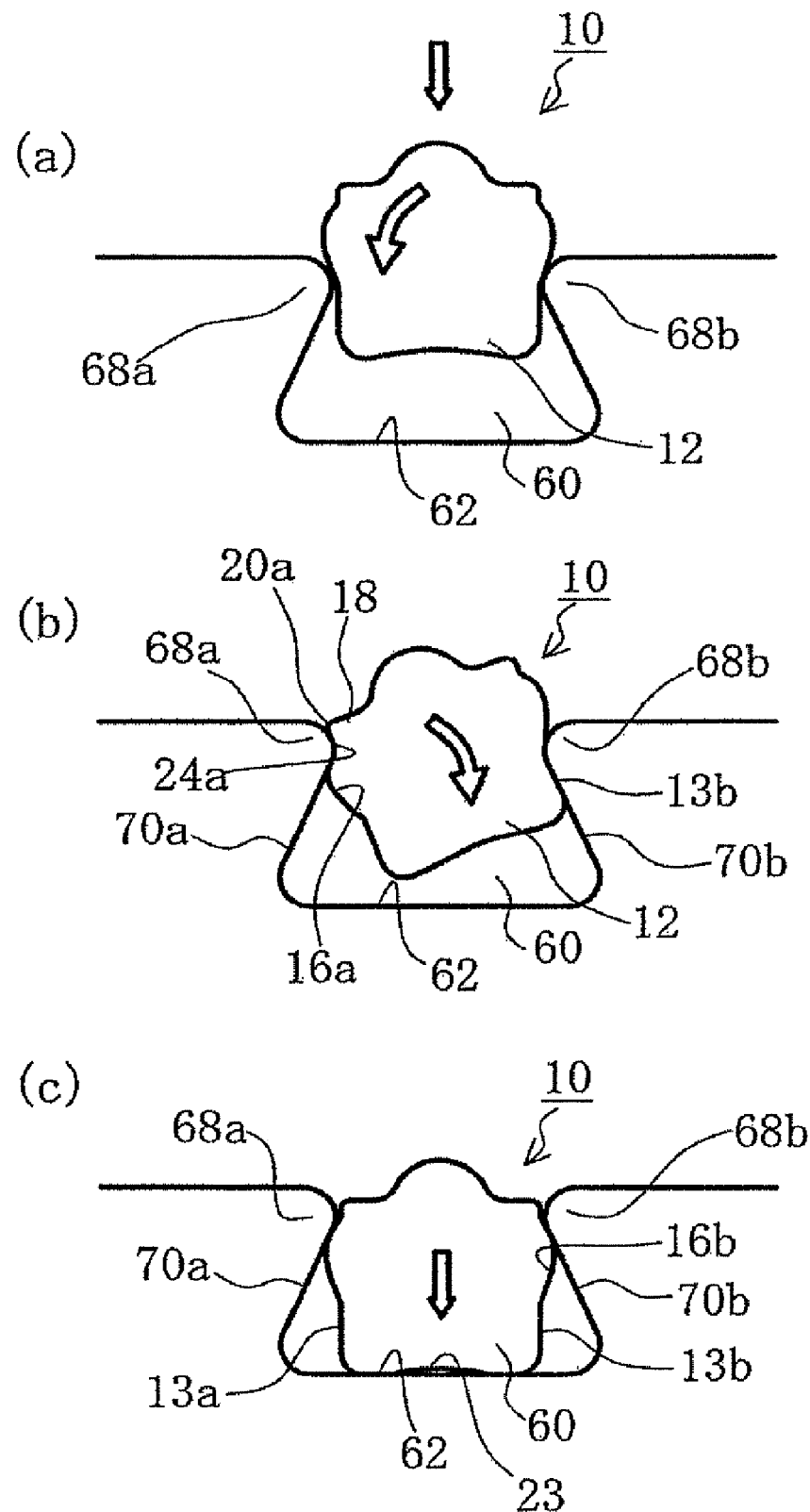
FIG. 4 is a schematic view showing a procedure for mounting the sealing material in the dovetail groove in accordance with an embodiment of the present invention.

Such mounting of the sealing material 10 for a dovetail groove to the dovetail groove 60 will be described in the following while referring to FIG. 4.

Arrows shown in FIGS. 4(a) to 4(c) indicate a direction in which a force is applied.

As shown in FIG. 4(a), a bottom portion 12 of the sealing material 10 for a dovetail groove is inserted into the dovetail groove 60 first.

As shown in FIG. 4(b), a concave 24a formed between the side protruding portion 16a and the corner portion 20a of the overhanging shoulder portion 18 in the sealing material 10 for a dovetail groove is abutted to the corner portion 68a of the dovetail groove 60, and the sealing material 10 for a dovetail groove inclines.

In the case in which the sealing material 10 for a dovetail groove is pressed in this state, the sealing material 10 for a dovetail groove is inserted in the bottom face direction of the dovetail groove 60 in such a manner that the sealing material 10 is revolved around the concave 24a as the base point. Consequently, as shown in FIG. 4(c), the side protruding portion 16b passes through the corner portion 68b of the opening edge of the dovetail groove 60, and the sealing material 10 is disposed on the bottom face 62 of the dovetail groove

60. In this case, only by slightly compressing a section around the side protruding portion 16b, the sealing material 10 for a dovetail groove can be placed in the dovetail groove 60.

In this case, the concave 23 formed on the bottom portion 12 enables the sealing material 10 for a dovetail groove to be easily deformed, and thereby the sealing material 10 for a dovetail groove can be mounted to the dovetail groove 60 without a large force.

From this state, the sealing material 10 for a dovetail groove can be completely mounted to the dovetail groove 60 by pressing the sealing material 10 in such a manner that the concave 23 is disposed on the bottom face 62 of the dovetail groove 60.

For the sealing material 10 for a dovetail groove, abutting portions 26a and 26b of the side protruding portions 16a and 16b are abutted to the oblique sides 70a and 70b of the dovetail groove 60. Consequently, in the state shown in FIG. 4(c), the sealing material 10 for a dovetail groove does not move in a width direction of the dovetail groove 60r and the sealing material 10 does not drop out since the opening edge of the dovetail groove 60 is narrow. Moreover, since the abutting portions 26a and 26b that are curved faces on the opening side of the side protruding portions 16a and 16b are abutted to the oblique sides 70a and 70b of the dovetail groove 60, the sealing material 10 for a dovetail groove does not drop out upward.

The behavior for tightening the sealing material 10 for a dovetail groove, after the sealing material 10 is mounted to one member 85, will be described in the following while referring to FIGS. 5(a) and 5(b).

As shown in FIG. 5(a), the sealing material 10 for a dovetail groove is mounted to one member 85, and the other member 90 is moved closer to the member 85 and is abutted to the top portion of the sealing protrusion 22.

As shown in FIG. 5(b), in the case in which the other member 90 is moved further closer to the member 85 from this state, the sealing protrusion 22 is pressed in the dovetail groove 60 in such a manner that the concave 23 of the bottom portion 12 is crushed.

In the sealing state shown in FIG. 5(b), a pressing force is applied almost perpendicularly to the sealing face, thereby reliably preventing the sealing material 10 for a dovetail groove from rolling.

As described above, for the member 85 to which the sealing material 10 for a dovetail groove has been mounted in the present embodiment, the sealing protrusion 22 is deformed first by tightening with the other member 90 and the concave 23 of the bottom portion 12 is sufficiently deformed, thereby obtaining a sealing force at a low load.

Even in the tightening state, the abutting portions 26a and 26b of the side protruding portions 16a and 16b are tightly abutted to the oblique sides 70a and 70b of the dovetail groove 60 in such a manner that the abutting portions 26a and 26b are deformed, thereby preventing the sealing material from rolling or being off-balance.

Even in the case in which a strong compressive load is applied beyond the scope of the assumption from the state shown in FIG. 5(b), since the corner portions 20a and 20b of the overhanging shoulder portion 18 are set above the position 72 of the narrowest section of the corner portions 68a and 68b of the dovetail groove 60, the corner portions 20a and 20b are just abutted to the corner portions 68a and 68b of the dovetail groove 60 and further compressional deformation can be suppressed, thereby preventing the sealing material 10 for a dovetail groove from rolling or being off-balance in the dovetail groove 60.

Figure 6:
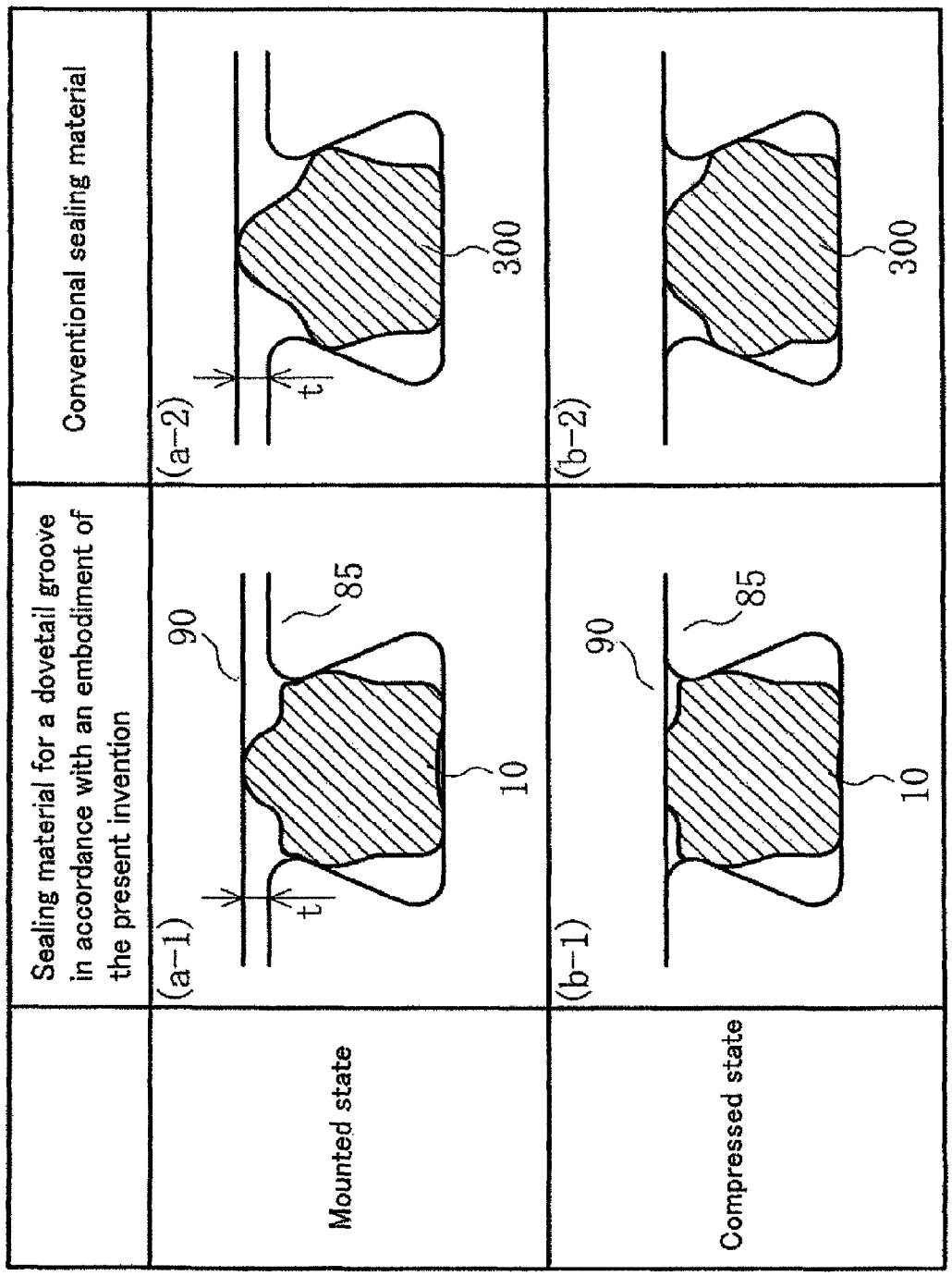
FIG. 6 is a schematic view showing a mounted state and a compressed state as a contrast between the sealing material for a dovetail groove in accordance with an embodiment of the present invention and a conventional sealing material.

FIGS. 6(a-1) to 6(b-2) are cross sectional views showing a mounting property and a compressive property as a contrast between the sealing material 10 for a dovetail groove in accordance with an embodiment of the present invention and a conventional sealing material 300.

The other member 90 is moved in a direction of one member 85 to compress the sealing material 10 for a dovetail groove shown in FIG. 6 in accordance with an embodiment of the present invention and a conventional sealing material 300 by a compression amount t.

Figure 7:
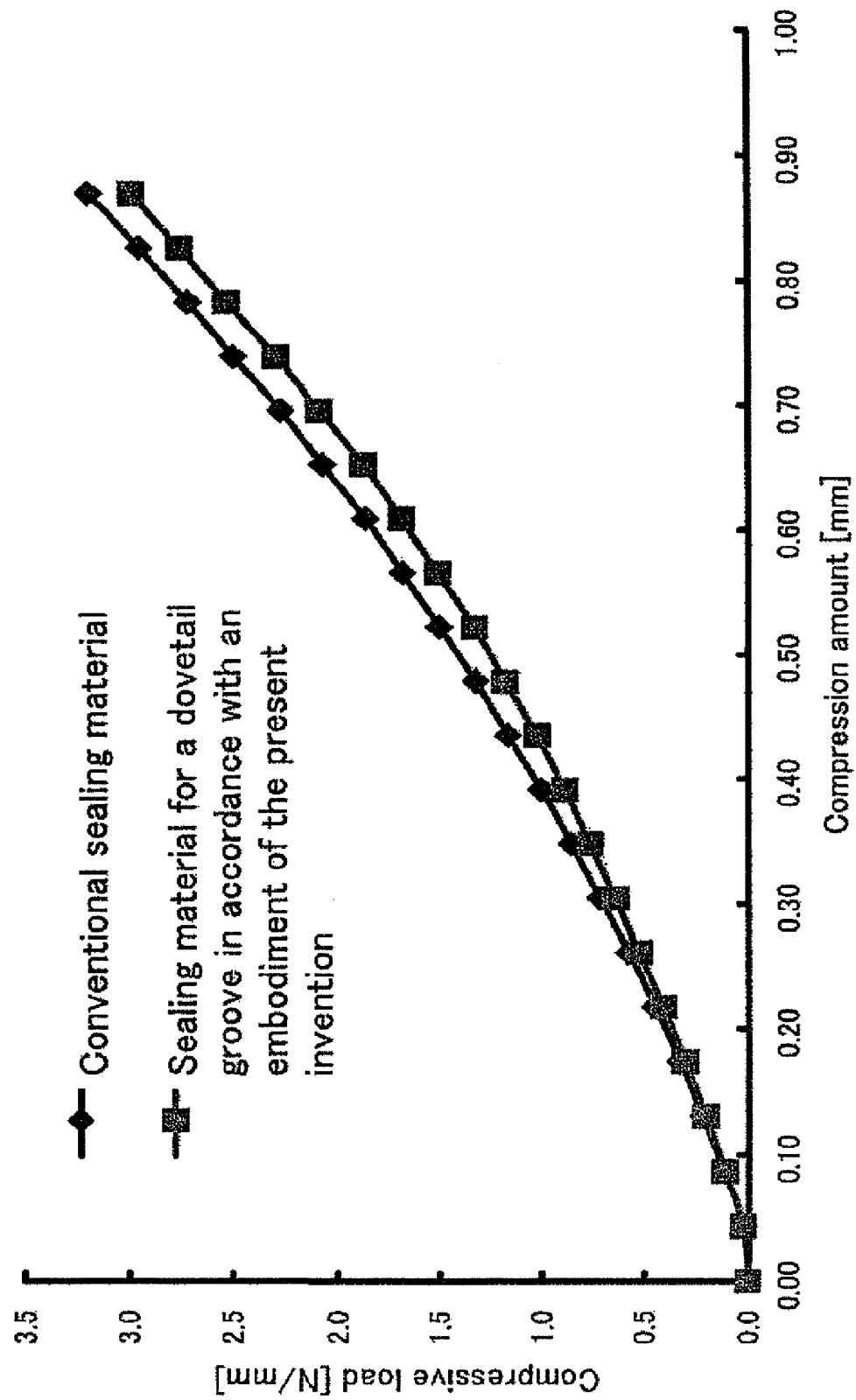
FIG. 7 is a graph showing a relationship between a compression amount and a compressive load as a contrast between the sealing material for a dovetail groove in accordance with an embodiment of the present invention and a conventional sealing material.

The graph of FIG. 7 shows a relationship between a compression amount and a compressive load as a contrast between an embodiment of the present invention and a conventional example.

As is clear from the graph of FIG. 7, a load for deformation by a compression amount t for the sealing material 10 for a dovetail groove in accordance with an embodiment of the present invention can be smaller than that of the conventional sealing material 300. Consequently, it is clear that a sealing property can be obtained at a low load during compression.

As described above, in a sealing section in general, a stress of a certain level or higher is applied to the sealing material 10 for a dovetail groove or the sealing material 300 to change a predetermined compression amount t, thereby displaying a stable sealing performance. However, in the case of the conventional sealing material 300, a required compression load is increased in proportion to the compression amount t.

On the other hand, in the case of the sealing material 10 for a dovetail groove in accordance with an embodiment of the present invention, a tightening load is smaller than that of the conventional sealing material 300, although a required compression load is increased in proportion to the compression amount t similarly to the conventional example.

As a result, even in the case in which a vacuum gate valve is enlarged with a growing in size of a processed material such as a wafer, it is not necessary to increase a compression load for the sealing material 10 for a dovetail groove to be mounted to the vacuum gate valve so much as compared with the conventional sealing material 300.

While the preferred embodiments of the sealing material 10 for a dovetail groove in accordance with the present invention have been described above, the present invention is not restricted to the embodiments.

Figure 8:
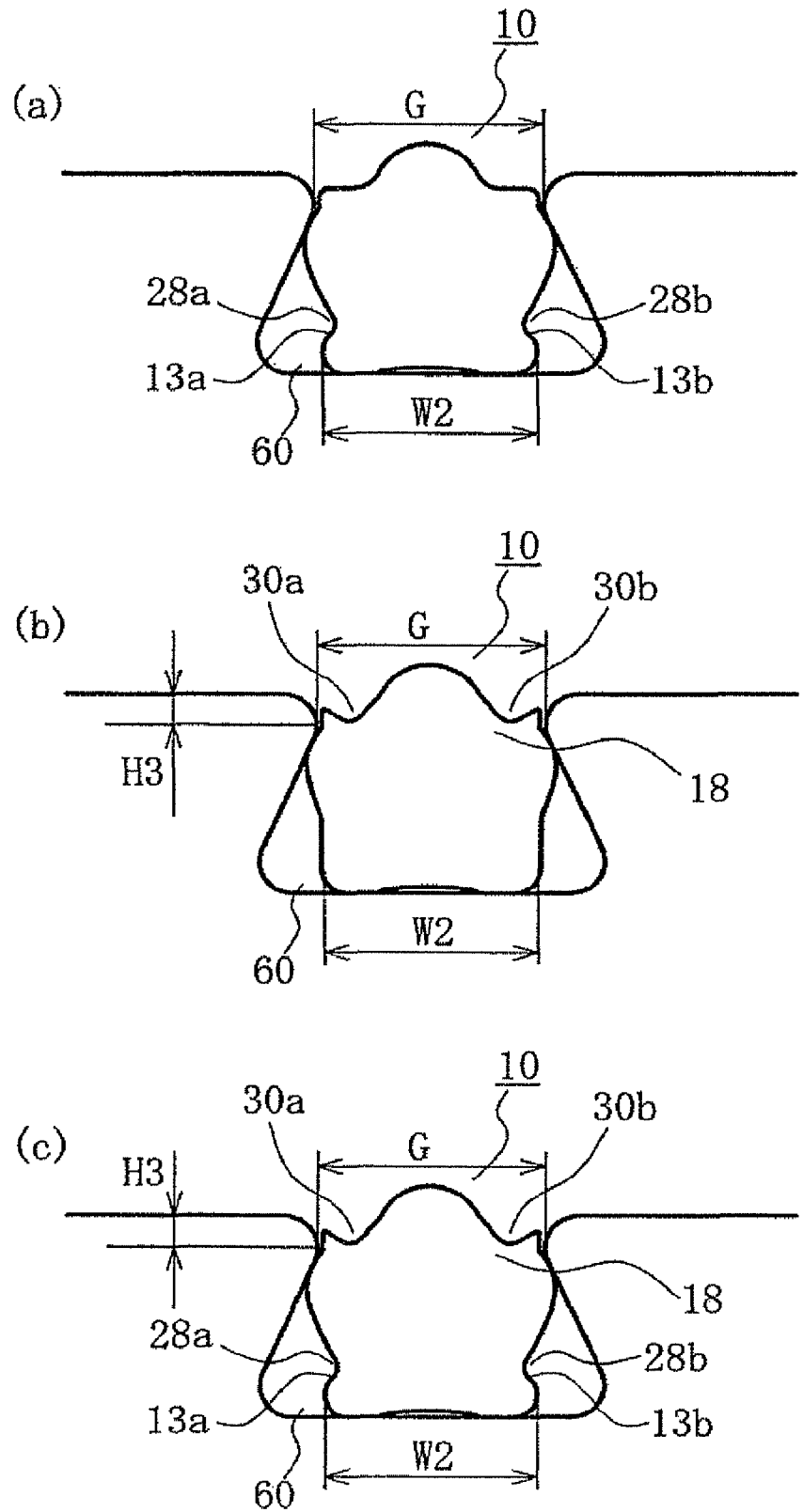
FIG. 8 is a schematic cross-sectional view showing another embodiment of a sealing material for a dovetail groove in accordance with the present invention.
Figure 9:
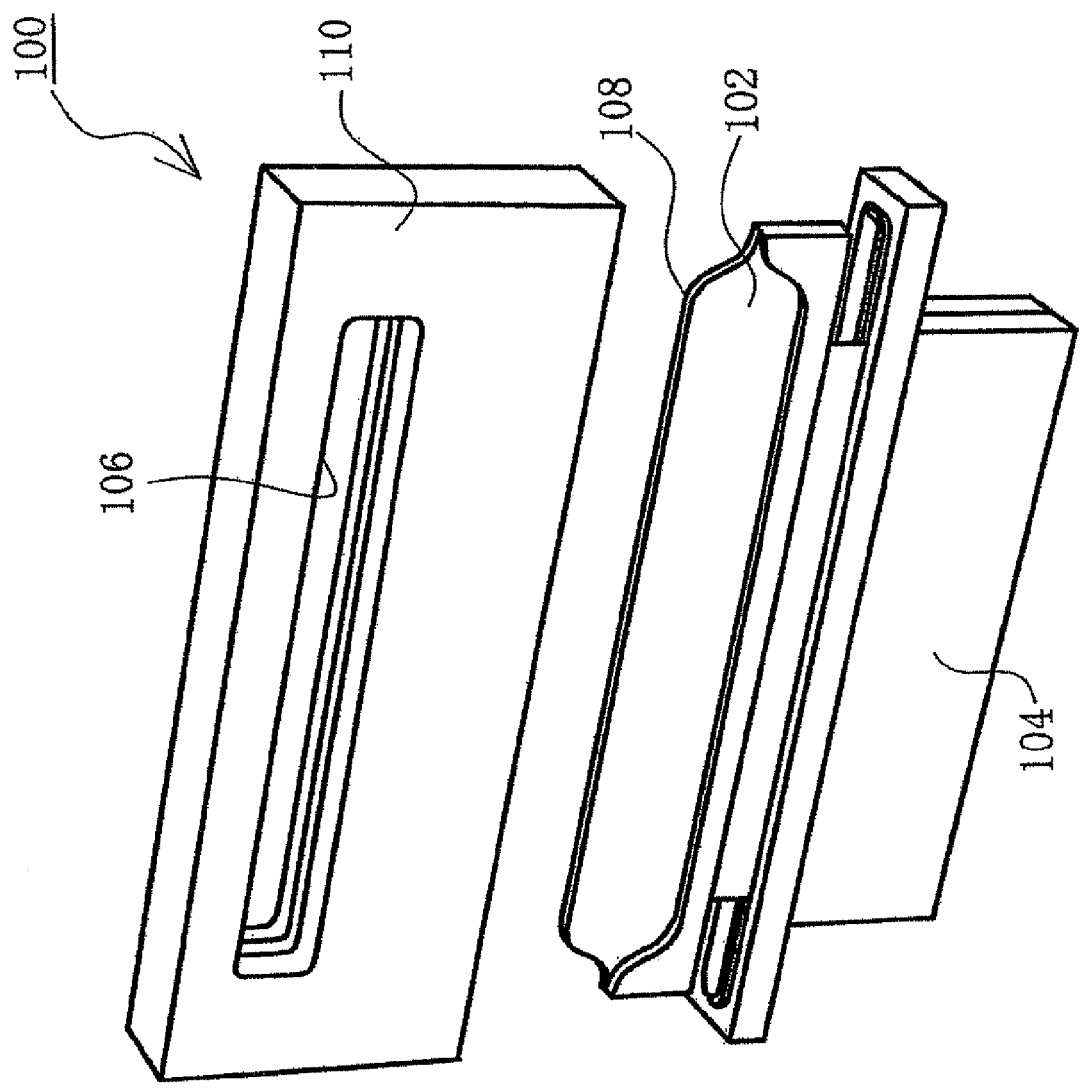
FIG. 9 is an exploded perspective view showing a vacuum gate valve for a conventional example in which a sealing material is mounted to a dovetail groove.
Figure 10:
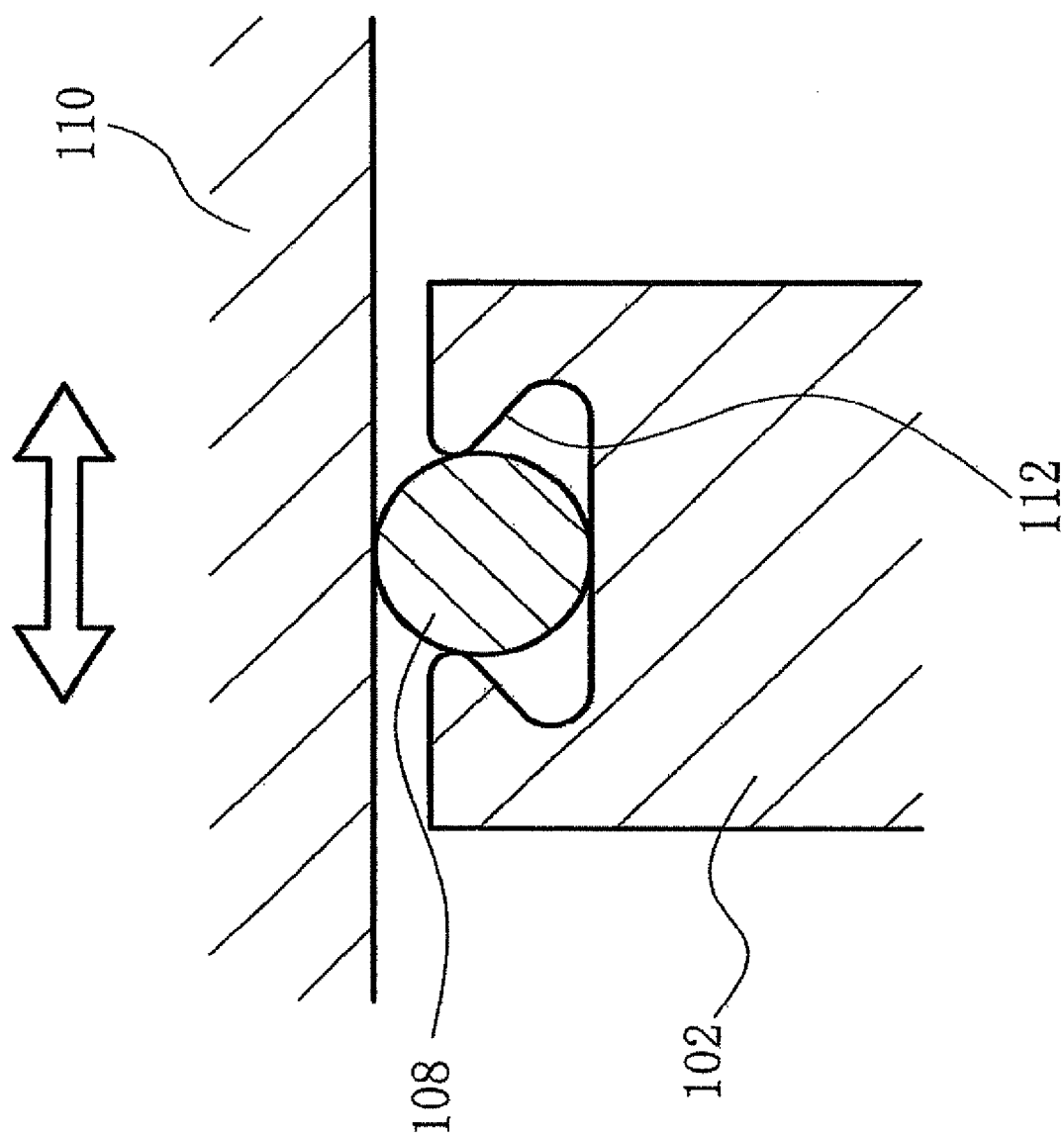
FIG. 10 is a cross-sectional view showing a conventional example indicating a force applied to a sealing material in the case in which an O ring is mounted to a valve body.
Figure 11:
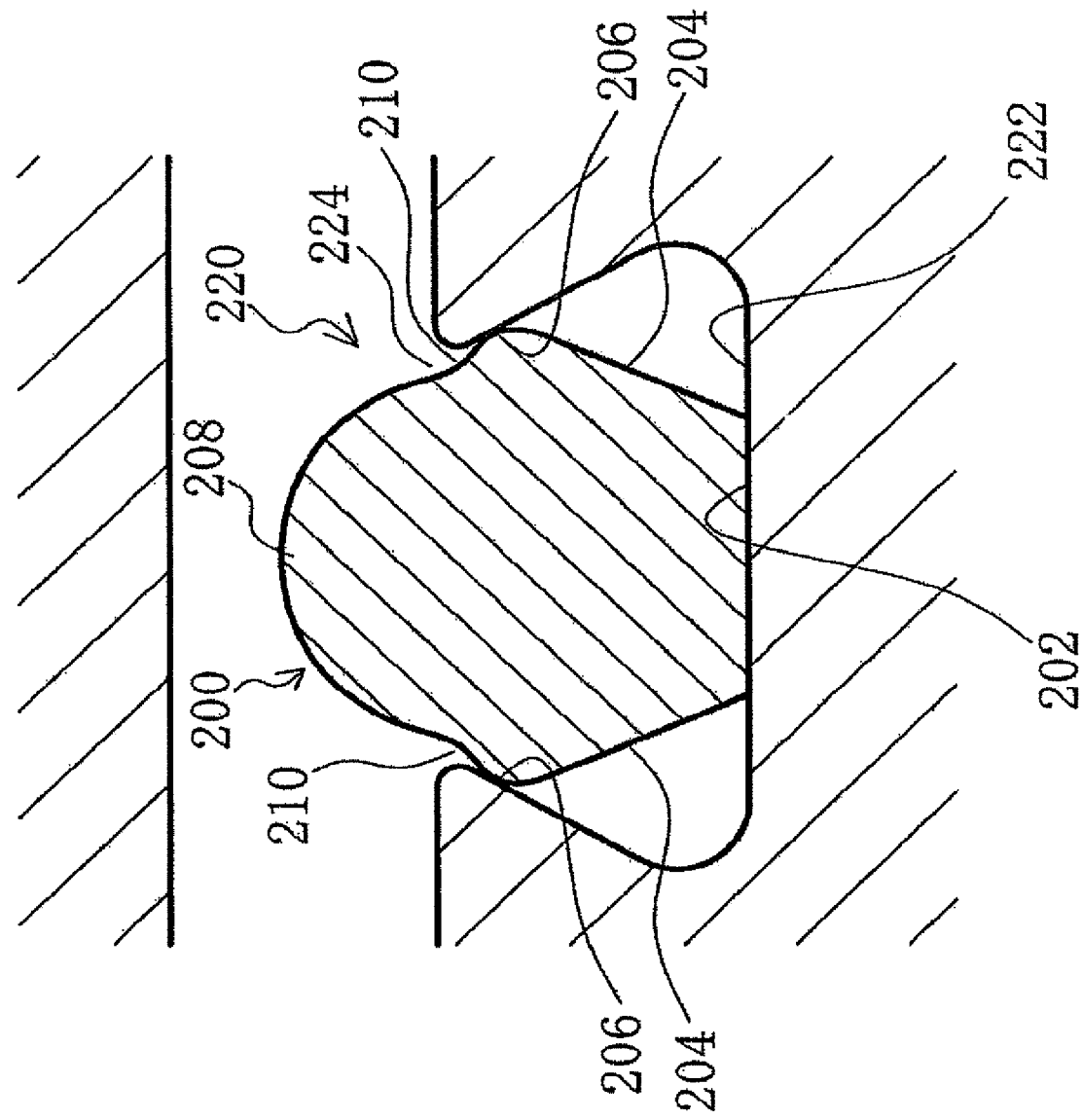
FIG. 11 is a cross-sectional view showing a sealing material for a dovetail groove disclosed in Japanese Patent Application Laid-Open Publication No. 2003-14126.

In the case of the sealing material 10 for a dovetail groove in accordance with an embodiment of the present invention, the side portions 13a and 13b of the bottom portion 12 are perpendicular to the bottom face 62 of the dovetail groove 60. However, as shown in FIG. 8(a) for instance, concaves 28a and 28b can be formed on the side portions 13a and 13b. Moreover, concaves 30a and 30b can also be formed on the linear section of the overhanging shoulder portion 18 as shown in FIG. 8(b).

Furthermore, as shown in FIG. 8(c), concaves 28a and 28b can be formed on the side portions 13a and 13b and concaves 30a and 30b can also be formed on the linear section of the overhanging shoulder portion 18.

More specifically, providing that the width W1 of the widest section of the bottom portion 12 of the sealing material 10 for a dovetail groove (a distance between the corner portions 14a and 14b) is smaller than the width G of the narrowest section of the opening portion of the dovetail groove and the corner portions 20a and 20b of the overhanging shoulder portion 18 is in the range of a position HR of the narrowest section, a shape of the sealing material 10 for a dovetail groove can be modified as needed.

Furthermore, the sealing protrusion 22 is formed on the almost central section in the embodiment of the present invention. The position of the sealing protrusion 22 can be changed in the range of the width W1 of the widest section of the overhanging shoulder portion 18. Moreover, the sealing protrusion 22 can also be in any shape such as a trapezoid and a rectangle.

In the above embodiments, the vacuum gate valve of a one-action type being used for a semiconductor manufacturing apparatus or a liquid crystal manufacturing apparatus in particular has been described. The application section of the present invention is not restricted to the embodiments, and of the present invention can also be applied to a vacuum gate valve of a two-action type. In particular, the present invention can be suitably applied to a vacuum gate valve of a load lock chamber in which a pressure reduction and an atmospheric release are repeated in a semiconductor manufacturing apparatus or an FPD manufacturing apparatus, etc. That is to say, the present invention can be effectively applied to any member that has a sealing grove of the dovetail groove 60.

The invention claimed is:

1. A sealing material in a closed circular shape for a dovetail groove to be mounted to a dovetail groove formed on a surface of one member and to be abutted to a surface of another member to seal a space between the one member and the other member in a jointing position of the one member and the other member facing to each other, the dovetail groove to which the sealing material for the dovetail groove is mounted, in a cross-sectional shape, having an opening portion in which a section close to the surface of the one member is narrowest, and being in a trapezoidal shape expanding in a tapered shape from an edge of the opening portion to a bottom face of the dovetail groove and having a pair of oblique sides and a flat bottom face, the sealing material for a dovetail groove in a cross-sectional shape comprising:

a bottom portion that comes into contact with the bottom face of the dovetail groove, the bottom portion comprising corner portions formed slightly narrower than the narrowest width of the opening portion of the dovetail groove;

a pair of side protruding portions that is formed continuously from the bottom portion and that is protruded in a width direction from the corner portion of the bottom portion in such a manner that the pair of side protruding portions is abutted to the pair of oblique sides formed inside the dovetail groove;

an overhanging shoulder portion that is formed continuously from the side protruding portions; and a sealing protrusion that is formed continuously from the overhanging shoulder portion and that is protruded upward from the opening portion of the dovetail groove to seal a space between the one member and the other member in the case in which the sealing protrusion is abutted to the surface of the other member, wherein a corner portion of the overhanging shoulder portion is positioned closer to the bottom face of the dovetail groove as compared with the position of the side end face of the opening portion of the dovetail groove and is positioned closer to the opening portion side of the dovetail groove as compared with the position of the narrowest section of the dovetail groove.

2. The sealing material for a dovetail groove as defined in claim 1, wherein the range of W1 is indicated by $0.75G<W1<G$ in the case in which a width of the widest section of the overhanging shoulder portion for the sealing material for a dovetail groove is W1 and a width of the narrowest section of the opening portion of the dovetail groove is G.

3. The sealing material for a dovetail groove as defined in claim 1, wherein the range of H1 is indicated by $1.20H<H1<1.60H$ in the case in which a distance from the bottom face of the dovetail groove to the side end face of the opening portion of the dovetail groove is H and a distance from the bottom face of the dovetail groove to the top position of the sealing protrusion is H1.

4. The sealing material for a dovetail groove as defined in claim 1, wherein the range of H2 is indicated by $0.90H<H2<0.95H$ in the case in which a distance from the bottom face of the dovetail groove to the side end face of the opening portion of the dovetail groove is H and a distance from the bottom face of the dovetail groove to the base end portion of the side protruding portion on the side end face side of the opening portion of the dovetail groove is H2.

5. The sealing material for a dovetail groove as defined in claim 1, wherein the range of W2 is indicated by $0.75G<W2<G$ in the case in which a width of the narrowest section of the opening portion of the dovetail groove is G and a width of the widest section of the bottom portion is W2.

6. The sealing material for a dovetail groove as defined in claim 1, wherein a concave is formed on the bottom portion.

7. The sealing material for a dovetail groove as defined in claim 1, wherein the sealing material for a dovetail groove bottom portion is in a symmetric shape with respect to a perpendicular line drawn from the top position of the sealing protrusion to the bottom portion.

8. A vacuum gate valve sealing material in a closed circular shape for a dovetail groove to be mounted to a dovetail groove formed on a surface of one member of a gate valve and to be abutted to a surface of another member of the gate valve to seal a space between the both members in a jointing position of a pair of members facing to each other, the dovetail groove to which the sealing material for the dovetail groove is mounted, in a cross-sectional shape, having an opening portion in which a section close to the surface of the one member is narrowest, and being in a trapezoidal shape expanding in a tapered shape from an edge of the opening portion to a bottom face of the dovetail groove and having a pair of oblique sides and a flat bottom face, the sealing material for a dovetail groove in a cross-sectional shape comprising:

a bottom portion that comes into contact with the bottom face of the dovetail groove, the bottom portion comprising corner portions formed slightly narrower than the narrowest width of the opening portion of the dovetail groove;

a pair of side protruding portions that is formed continuously from the bottom portion and that is protruded in a width direction from the corner portion of the bottom portion in such a mariner that the pair of side protruding portions is abutted to the pair of oblique sides formed inside the dovetail groove;

an overhanging shoulder portion that is formed continuously from the side protruding portions; and a sealing protrusion that is formed continuously from the overhanging shoulder portion and that is protruded upward from the opening portion of the dovetail groove to seal a space between the one member and the other member in the case in which the sealing protrusion is abutted to the surface of the other member, wherein a corner portion of the overhanging shoulder portion is positioned closer to the bottom face of the dovetail groove as compared with the position of the side end face of the opening portion of the dovetail groove and is positioned closer to the opening portion side of the dovetail groove as compared with the position of the narrowest section of the dovetail groove.

9. The vacuum gate valve of claim 8, wherein the range of W1 is indicated by 0.75G<W1<G in the case in which a width of the widest section of the overhanging shoulder portion for the sealing material for a dovetail groove is W1 and a width of the narrowest section of the opening portion of the dovetail groove is G.

10. The vacuum gate valve of claim 8, wherein the range of H1 is indicated by 1.20H<H1<1.60H in the case in which a distance from the bottom face of the dovetail groove to the side end face of the opening portion of the dovetail groove is H and a distance from the bottom face of the dovetail groove to the top position of the sealing protrusion is H1.

11. The vacuum gate valve of claim 8, wherein the range of H2 is indicated by 0.90H<H2<0.95H in the case in which a distance from the bottom face of the dovetail groove to the side end face of the opening portion of the dovetail groove is H and a distance from the bottom face of the dovetail groove to the base end portion of the side protruding portion on the side end face side of the opening portion of the dovetail groove is H2.

12. The vacuum gate valve of claim 8, wherein the range of W2 is indicated by 0.75G<W2<G in the case in which a width of the narrowest section of the opening portion of the dovetail groove is G and a width of the widest section of the bottom portion is W2.

13. The vacuum gate valve of claim 8, wherein a concave is formed on the bottom portion.

14. The vacuum gate valve of claim 8, wherein the sealing material for a dovetail groove bottom portion is in a symmetric shape with respect to a perpendicular line drawn from the top position of the sealing protrusion to the bottom portion.

* * * * *

UNITED STATES PATENT AND TRADEMARK OFFICE
CERTIFICATE OF CORRECTION

| | | |
|---|---|---|
| PATENT NO. | : 8,181,972 B2 | Page 1 of 1 |
| APPLICATION NO. | : 12/162881 | |
| DATED | : May 22, 2012 | |
| INVENTOR(S) | : Kazuaki Tsuji | |

It is certified that error appears in the above-identified patent and that said Letters Patent is hereby corrected as shown below:

In the Claims:

Column 12, Line 55, Claim 8, delete "mariner" and insert -- manner --

Signed and Sealed this
Eighteenth Day of September, 2012

David J. Kappos
*Director of the United States Patent and Trademark Office*